(12) United States Patent
He et al.

(10) Patent No.: US 8,889,293 B2
(45) Date of Patent: Nov. 18, 2014

(54) LITHIUM ION BATTERY

(71) Applicants: Xiang-Ming He, Beijing (CN); Li Wang, Beijing (CN); Jian-Jun Li, Beijing (CN); Jian Gao, Beijing (CN); Wen-Ting Sun, Beijing (CN)

(72) Inventors: Xiang-Ming He, Beijing (CN); Li Wang, Beijing (CN); Jian-Jun Li, Beijing (CN); Jian Gao, Beijing (CN); Wen-Ting Sun, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/652,610

(22) Filed: Oct. 16, 2012

(65) Prior Publication Data

US 2013/0302678 A1 Nov. 14, 2013

(30) Foreign Application Priority Data

May 11, 2012 (CN) .......................... 2012 1 0145426

(51) Int. Cl.
*H01M 4/60* (2006.01)
(52) U.S. Cl.
USPC ........................................ 429/213
(58) Field of Classification Search
None
See application file for complete search history.

(56) References Cited

U.S. PATENT DOCUMENTS 6,790,560 B2 * 9/2004 Wakihara et al. ........ 429/231.95
2012/0059129 A1 3/2012 He et al.

FOREIGN PATENT DOCUMENTS

| CN | 101465441 A | 6/2009 |
|---|---|---|
| CN | 101764258 | 6/2010 |
| TW | 201213365 | 4/2012 |

OTHER PUBLICATIONS

Fanous et al. Structure-Related Electrochemistry of Sulfur-Poly(acrylonitrile) Composite Cathode Materials for Rechargeable Lithium Batteries. American Chemical Society. p. 5024-5028. Oct. 20, 2011.*

* cited by examiner

*Primary Examiner* — Patrick Ryan
*Assistant Examiner* — Christopher Domone
(74) *Attorney, Agent, or Firm* — Novak Druce Connolly Bove + Quigg LLP

(57) ABSTRACT

A lithium ion battery includes a cathode electrode, an anode electrode, and an electrolyte. The anode electrode is spaced from the cathode electrode. The anode electrode includes an anode active material. The anode active material includes sulfur grafted poly(pyridinopyridine). The sulfur grafted poly(pyridinopyridine) includes a poly(pyridinopyridine) matrix and sulfur dispersed in the poly(pyridinopyridine) matrix. The electrolyte is located between the cathode electrode and the anode electrode.

11 Claims, 4 Drawing Sheets

LITHIUM ION BATTERY

CROSS-REFERENCE TO RELATED APPLICATIONS

This application claims all benefits accruing under 35 U.S.C. §119 from China Patent Application No. 201210145426.7, filed on May 11, 2012, in the China Intellectual Property Office, the disclosure of which is incorporated herein by reference.

BACKGROUND

1. Technical Field

The present disclosure relates to lithium ion batteries.

2. Description of Related Art

Lithium batteries have small weight, high discharge voltage, long cyclic life and high energy density compared with conventional lead storage batteries, nickel-cadmium batteries, nickel-hydrogen batteries, and nickel-zinc batteries.

An anode of a lithium battery should have properties such as high energy density, low open-circuit voltage versus lithium metal electrode, high capacity retention, good performance in common electrolytes, high density (e.g. >2.0 g/cm$^3$), good stability during charge and discharge processes, and low cost. Presently, the most common anode active material is carbonous/carbonaceous material such as natural graphite, artificial graphite, and amorphous-based carbon.

Carbonous/carbonaceous material has high theoretical specific capacity, but an SEI film forming process in the first cycle greatly decreases the real specific capacity, which is generally only about 200 mAh/g to about 500 mAh/g. Further, the potential difference between the carbonous/carbonaceous material and the lithium metal is not very large. Thus, the lithium ion battery may still form a short circuit between the cathode and anode caused by the lithium dendrite formed on the surface of the carbonous/carbonaceous anode. Furthermore, the coulombic efficiency of the lithium ion battery with the carbonous/carbonaceous anode is still relatively low.

Elemental sulfur has been reported to be a cathode active material of the lithium ion battery. Theoretical specific capacity of the elemental sulfur is about 1678 mAh/g, which is one of the highest known cathode active materials for the lithium ion batteries. However, the electric potential of sulfur versus lithium metal is relatively high, and sulfur has not been used as an anode active material of the lithium ion battery.

What is needed, therefore, is to provide a lithium ion battery having a relatively high coulombic efficiency, specific capacity, and safety.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
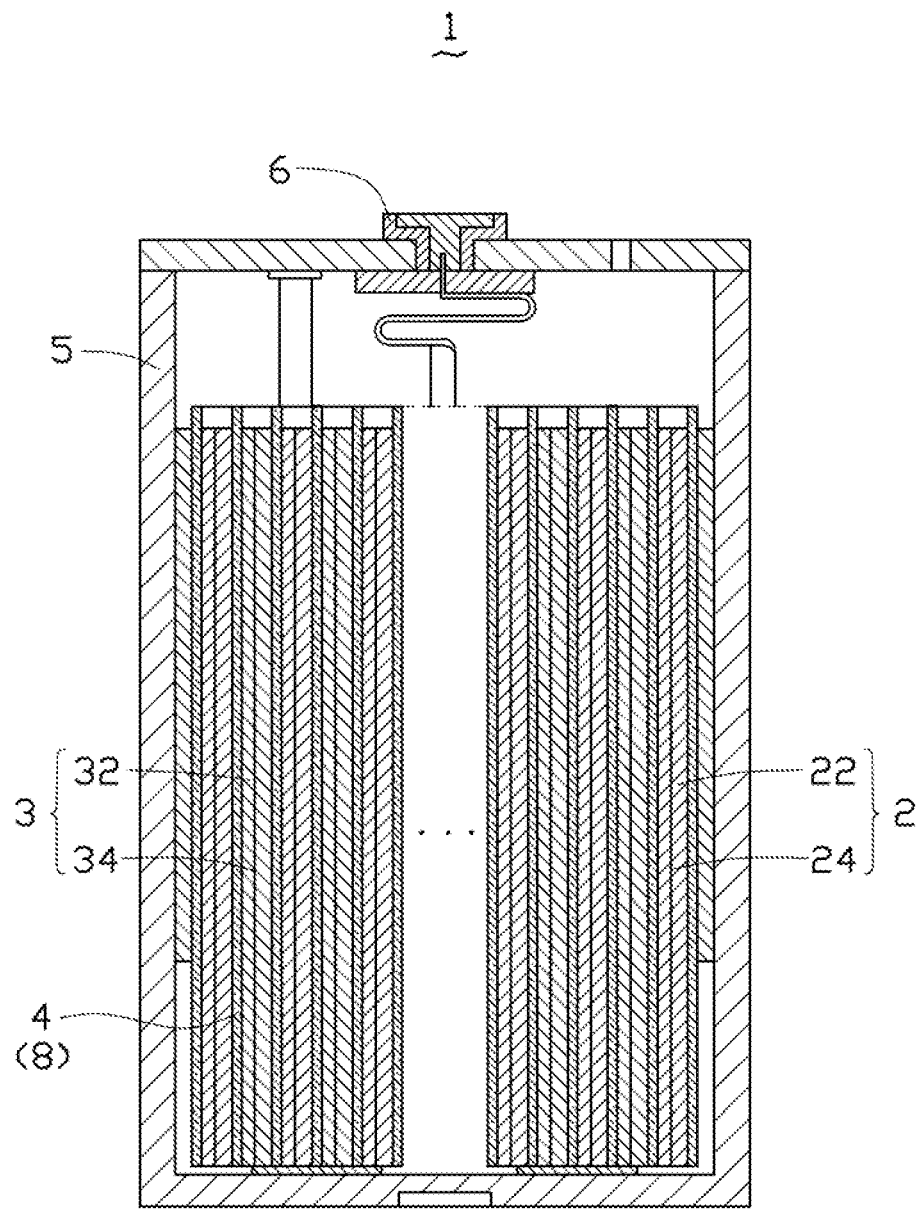
FIG. 1 is a schematic cross-sectional view of an embodiment of a lithium ion battery.

Referring to FIG. 1, one embodiment of a lithium ion battery 1 includes a cathode electrode 2, an anode electrode 3, and a non-aqueous electrolyte 8 disposed between the cathode electrode 2 and the anode electrode 3.

The cathode electrode 2 can include a cathode current collector 24 and a cathode material layer 22. The cathode current collector 24 is used for supporting the cathode material layer 22 and conducting current. A shape of the cathode current collector 24 can be a continuous sheet or a network. A material of the cathode current collector 24 can be metal or alloy, such as aluminum, titanium, or stainless steel. The cathode material layer 22 is disposed on at least one surface of the cathode current collector 24. The cathode material layer 22 includes a cathode active material, and can further include a conductive agent and a binder. The cathode active material, conductive agent, and the binder can be uniformly mixed with each other.

The anode electrode 3 can include an anode current collector 34 and an anode material layer 32. The anode current collector 34 is used for supporting the anode material layer 32 and conducting current. A shape of the anode current collector 34 can be a continuous sheet or a network. A material of the anode current collector 34 can be metal or alloy, such as copper, nickel, or stainless steel. The anode material layer 32 is disposed on at least one surface of the anode current collector 34. The anode material layer 32 includes an anode active material, and can further include a conductive agent and a binder. The anode active material, conductive agent, and the binder can be uniformly mixed with each other.

The anode material layer 32 faces the cathode material layer 22. Both the anode material layer 32 and the cathode material layer 22 are in contact with the electrolyte. The electrolyte 8 can be a solid electrolyte film or a liquid non-aqueous electrolyte solution. The solid electrolyte film can be sandwiched between the anode electrode 3 and the cathode electrode 2. If the lithium ion battery 1 uses the liquid non-aqueous electrolyte solution, the cathode electrode 2 and the anode electrode 3 are both disposed in the liquid non-aqueous electrolyte solution. The lithium ion battery 1 can further include a separator 4 disposed between the anode material layer 32 and the cathode material layer 22 to electrically insulate them from each other and the lithium ions can pass therethrough. The liquid non-aqueous electrolyte solution includes an organic solvent and a lithium salt dissolved in the organic solvent. The organic solvent can be selected from cyclic carbonates, linear carbonates, cyclic ethers, linear ethers, nitriles, and amides, and can be at least one of ethylene carbonate (EC), propylene carbonate (PC), ethylmethyl carbonate (EMC), diethyl carbonate (DEC), dimethyl carbonate (DMC), butylenes carbonate, vinylene carbonate, methylethyl carbonate, methyl acetate, ethyl acetate, propyl acetate, methyl propionate, ethyl propionate, γ-butyrolactone, 1,2-dimethoxyethane, 1,2-diethoxyethane, tetrahydrofuran, 1,2-dioxane, 2-methyltetrahydrofuran, acetonitrile, and dimethylformamide. The lithium salt may be at least one of $LiPF_6$, LiBOB, $LiBF_4$, $LiSbF_6$, $LiAsF_6$, $LiClO_4$, $LiCF_3SO_3$, Li(CF$_3$SO$_2$)$_2$N, LiC$_4$F$_9$SO$_3$, LiSbF$_6$, LiAlO$_4$, LiAlCl$_4$, LiCl, and LiI. The separator 4 can be a porous membrane. The material of the separator can be polyolefins, such as polypropylene (PP) or polyethylene (PE), or inorganic material such as porous ceramics.

The conductive agents and the binders in the anode material layer 32 and the cathode material layer 22 can be the same. The conductive agent can be a carbonaceous material such as carbon black, acetylene black, conductive polymers, carbon fibers, carbon nanotubes, graphene, and graphite. The binder can be at least one of polyvinylidene fluoride (PVDF), polytetrafluoroethylene (PTFE), and styrene-butadiene rubber (SBR).

The materials of the anode current collector 34, the cathode current collector 24, the conductive agent, the binder, the electrolyte, and the separator 4 are not limited by the above listed materials, and can be selected from other known materials.

The lithium ion battery 1 can further include an exterior encapsulating structure, such as a hard battery case 5 sealed by a sealing member 6, or a soft encapsulating bag, having the cathode electrode 2, the anode electrode 3, the separator 4, the electrolyte 8 located therein. The lithium ion battery 1 can further include a connecting component achieving an electrical connection between the current collector of the lithium ion battery 1 and the external circuit.

Anode Active Material

The anode active material, in one embodiment of the lithium ion battery, includes a sulfur grafted poly(pyridinopyridine) (SPPY). The SPPY includes a poly(pyridinopyridine) (PPY) matrix and sulfur dispersed in the PPY matrix. In one embodiment, a weight percentage of the sulfur in the SPPY is equal to or smaller than 41%.

A material of the PPY matrix includes a chemical group of formula (1):

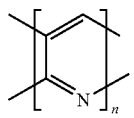

(1)

wherein n is an integer larger than 1.

The PPY matrix is formed from a cyclizing reaction of polyacrylonitrile (PAN).

The sulfur dispersed in the PPY matrix can be combined with the PPY matrix as a dopant. That is to say, the sulfur is combined with the PPY matrix with a covalent bond. The sulfur can exist as a "poly-sulfur group" consisting of one or more sulfur elements, which can be represented by a formula of S$_x$, wherein x is an integer between 1 and 8. In one embodiment, 2≤x≤8 (e.g., x=4). When the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond. The SPPY can include a plurality of the poly-sulfur groups dispersed in the PPY matrix and combined with the PPY matrix with the covalent bonds.

In one embodiment, the S$_x$ is doped in the chemical group of formula (1) and covalent bonded with a carbon element thereof. For example, the SPPY can include a chemical group of formula (2):

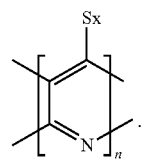

(2)

The molecular weight of the SPPY can be equal to or larger than 188.

The S$_x$ can also be covalently bonded with other functional groups at the other side of the sulfur chain. For example, the SPPY can include a chemical group of formula (3):

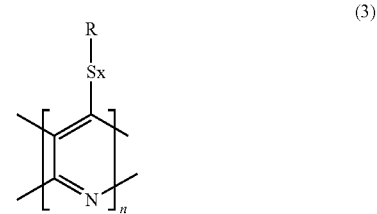

(3)

wherein R represents a functional group.

In the chemical group of formula (3), R is not limited and can be selected as needed, such as carboxyl groups, hydroxyl groups, and aromatic groups.

In another embodiment, R can also be the chemical groups of formula (1) or formula (2). For example, the SPPY can include a chemical group of formula (4):

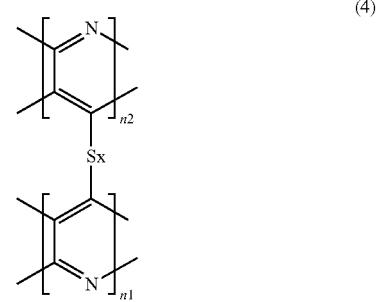

(4)

wherein n1 and n2 are both integers larger than 1, and n1 and n2 can be the same or different.

The chemical group of formula (4) is formed by two chemical groups of formula (1) connected by the S$_x$. Further, in the chemical group of formula (4), the two connected pyridinopyridine groups

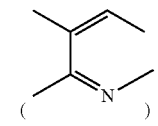

belong to different chemical groups of formula (1).

In another embodiment, the two connected pyridinopyridine groups can also belong to the same chemical group of formula (1). The two connected pyridinopyridine groups can be adjacent to each other or spaced by other pyridinopyridine groups.

For example, the SPPY can include a chemical group of formula (5) having two adjacent pyridinopyridine groups connected by $S_x$:

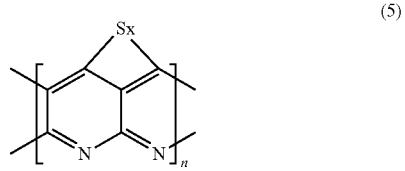

(5)

When the two pyridinopyridine groups connected by Sx are spaced, the SPPY can include a chemical group of formula (6):

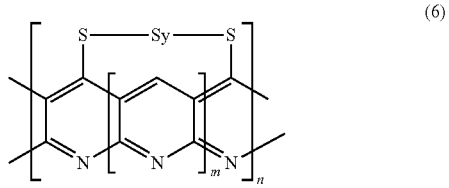

(6)

wherein Sy is also a "poly-sulfur group" including a sulfur chain, m and y are both an integer larger than 0. In one embodiment, m≤y≤6.

In another embodiment, the sulfur dispersed in the PPY matrix can be elemental sulfur composited with the PPY matrix. The elemental sulfur can have a shape of particles or grains. A size of the elemental sulfur particle can be very small.

In one embodiment, one elemental sulfur particle can be one sulfur molecule (e.g., a $S_8$ ring). In another embodiment, one elemental sulfur particle can be a sulfur atom cluster consisting of a plurality of sulfur atoms. For example, the sulfur atom cluster can be $S_x$, wherein x is an integer between 1 and 7. As a large amount of the elemental sulfur particles are uniformly dispersed in the PPY matrix, and each elemental sulfur particle can be a sulfur molecule or sulfur atom cluster, the sulfur can be seen as monodispersed in the PPY matrix.

The SPPY can include the "poly-sulfur group" and the elemental sulfur. In the above formulas (1) to (6), the larger the value of n, n1, and n2, the more the pyridinopyridine groups are in the PPY matrix, the longer the chain of the pyridinopyridine groups, and the better the conductivity of the SPPY.

One embodiment of a method for making the SPPY includes steps of:

S1, mixing an elemental sulfur with a PAN to form a mixture;

S2, sintering the mixture in a sealed container filled with a protective gas at a temperature of about 320° C. to about 400° C., to form a sintered product; and S3, heating the sintered product to a temperature above a sublimation temperature to remove at least a part of an un-reacted elemental sulfur from the sintered product.

In the step S1, the elemental sulfur and the PAN can both have a shape of powder or particles. The powder or particles of the elemental sulfur and the PAN can be uniformly mixed by mechanically stirring. The molecular weight of the PAN is not limited, and can be in a range from 1000 to 100000.

In the step S2, the elemental sulfur is heated to the gas state and uniformly contacting with the surface of the PAN. At the same time, the PAN has a pyrolysis and a cyclizing process during the sintering. The sulfur that is in contact with the PAN is reacted with or combined with the cyclized PAN, and thus forming the SPPY. In the SPPY, a majority of the sulfur is the "poly-sulfur group" covalently bonded with the PPY matrix. A comparison of Raman spectra of the sintered product, the elemental sulfur, and the pyrolytic pure PAN shows that compared with the two absorption peaks corresponding to the two C—C bonds (often referred to as G-band and D-band) of pyrolytic pure PAN, the two similar absorption peaks in the sintered product shift to lower wave numbers, which shows that the sulfur and the PPY matrix are bonded by C—S covalent bonds.

The protective gas can be an inert gas or a nitrogen gas. In the sealed container, the elemental sulfur will not leak out during the sintering. Further, due to the gasification of the elemental sulfur, the gas pressure in the sealed container can be larger than 1 atmospheric pressure. Therefore, the sealed container can promote the uniform dispersion of the sulfur in the sintered product.

At a temperature of about 320° C. to about 400° C., the PAN can be fully cyclized to form a plurality of pyridinopyridine groups joined together, such that the n of formula (2) can be equal to or larger than 10. In one embodiment, the sintering temperature is about 350° C. The sintering time can be determined by the amount of the mixture, and can be in a range from about 1 hour to about 10 hours. In one embodiment, the mixture is sintered in a sealed autoclave at a temperature of 350° C. for about 2 hours, and the weight percentage of the sulfur in the sintered product is about 47%.

In the step S3, the heating temperature is about 150° C. to about 170° C. In the sintering step of S2, the elemental sulfur may not be totally reacted with the PAN, and still remains as a relatively large particle in the sintered product. During the step S3, the unreacted elemental sulfur in the relatively large size can be completely or at least partially removed from the sintered product. However, the "poly-sulfur group" and the elemental sulfur in small particle size would not be removed. Thus, the weight percentage of the sulfur in the SPPY is equal to or less than 41%. Sulfur is an active material in the charge/discharge process of the lithium ion battery. The removal of large sized elemental sulfur can dramatically increase the capacity retention of the lithium ion battery.

The heating time of the step S3 can be decided by the amount of the sintered product (e.g., about 30 minutes to about 4 hours). In one embodiment, the sintered product is heated in vacuum at a temperature of about 150° C. for about 1 hour until the final product has a constant weight. The sulfur is about 41% of the final product.

Figure 2:
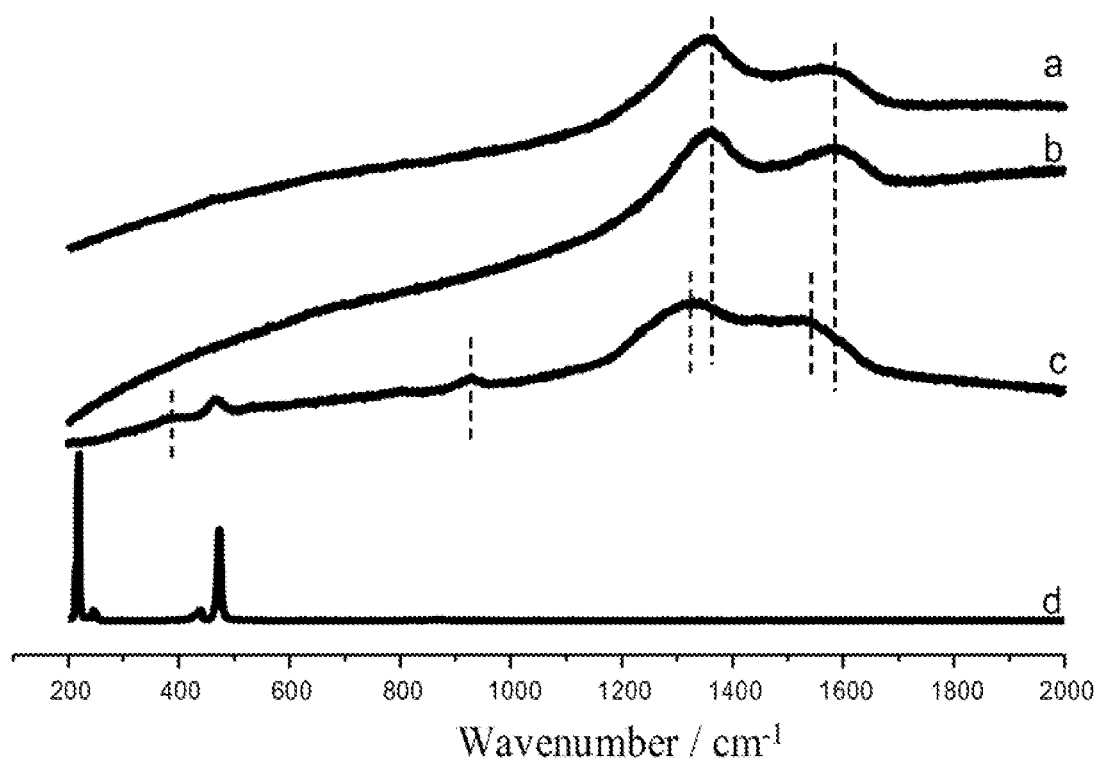
FIG. 2 shows a Raman spectra of (a) pyrolytic PAN in argon atmosphere, (b) pyrolytic PAN in air, (c) SPPY, and (d) elemental sulfur.

Referring to FIG. 2, the final product having the step of S3 is compared with the elemental sulfur and the pyrolytic pure PAN in the Raman spectra. In FIG. 2, the curve a is the Raman spectra of the pyrolytic pure PAN formed by having pure PAN sintered in an Ar gas, the curve b is the Raman spectra of the pyrolytic pure PAN formed by having pure PAN sintered in air, the curve c is the Raman spectra of the final product having the heating step of S3 in vacuum, and the curve d is the Raman spectra of the elemental sulfur. FIG. 2 shows that the curves a and b both have main bands at 1582 $cm^{-1}$ and 1375 $cm^{-1}$, which are often referred to as the G mode and D mode, respectively. However, these bands (387 $cm^{-1}$ and 928 $cm^{-1}$) in the curve c (i.e., for SPPY) shift to a lower wavenumber, which indicates that the sulfur and the PPY matrix are bonded by C—S covalent bonds.

Further, after the steps S2 and S3, the method can further include a step S4 of electrochemically reducing the "poly-sulfur group" of $S_x$ into an elemental sulfur. The reducing voltage for the electrochemically reducing "poly-sulfur group" of $S_x$ can be about 1.7 V to about 1.75 V (vs. $Li^+/Li$).

In one embodiment, the final product can be arranged in an electrochemical reactor (e.g., in an electrochemical battery) as an anode electrode, and then the battery is discharged at a voltage of about 1.7 V to about 1.75 V (vs. Li$^+$/Li). In one embodiment, the counter electrode is lithium metal, the battery is discharged using a constant current density of about 20 mA/g until the battery reaches a discharge cut-off voltage of about 0V. The "poly-sulfur group" has one or more sulfur elements (smaller than 8), and the "poly-sulfur group" is joined to the carbon atoms of the PPY matrix by covalent bonds. Thus, due to the electrochemically reducing step, the covalent bonds are broken, and a plurality of elemental sulfur particles, each of which is one sulfur molecule (e.g., a S$_8$ ring) or a sulfur atom cluster having 1 to 7 sulfur atoms can be formed. The plurality of elemental sulfur particles are uniformly dispersed in the PPY matrix. However, the electrochemically reducing step of the step S4 is an irreversible reaction. The elemental sulfur particles cannot be joined to the carbon atoms of the PPY matrix again by covalent bonds through an electrochemically oxidizing step.

Figure 3:
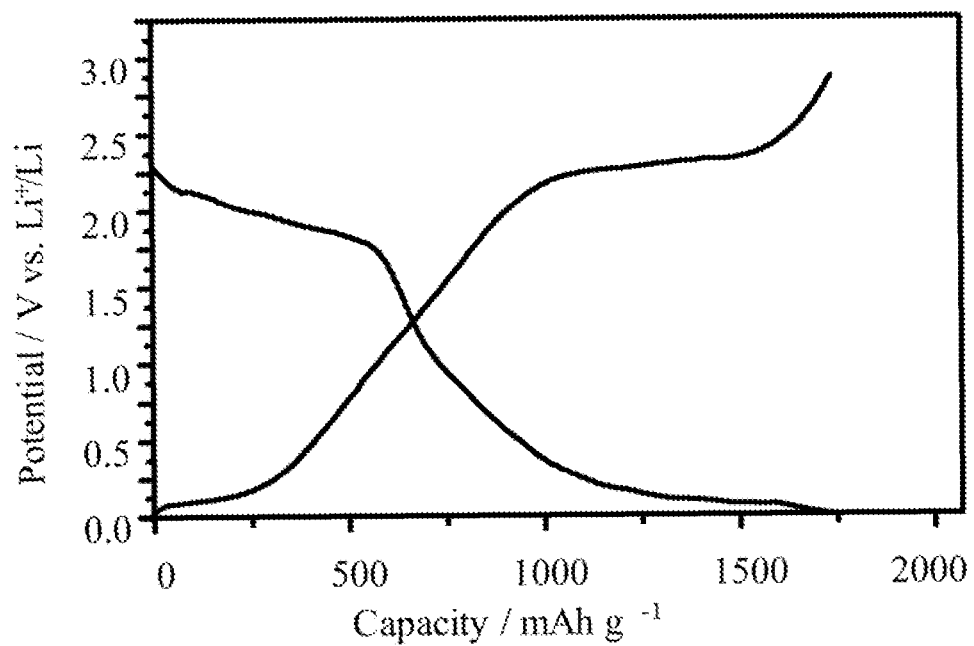
FIG. 3 shows discharge and charge curves of an embodiment of a lithium ion battery.

Referring to FIG. 3, a lithium ion battery using the SPPY as the anode active material and the lithium metal as the counter electrode is assembled. The lithium ion battery is cycled using a constant current in a galvanostatic charge/discharge measurement. As shown in the charge/discharge curves of the lithium ion battery in FIG. 3, the curves have plateaus between a voltage range of about 0.1V to about 0.25V.

Therefore, the SPPY in the voltage range of about 0.1V to about 0.25V has a reversible charge/discharge capacity, and can be used as an anode active material of the lithium ion battery. More specifically, the SPPY has a discharge process at about 2 V and a charge process at about 2.25 V. Therefore, when the SPPY is used as the anode active material, the cathode active material can be selected from the cathode active materials having a relatively high voltage (e.g., larger than or equal to about 4 V vs. Li$^+$/Li).

More specifically, the cathode active material can be at least one of the spinel type materials, lithium cobalt phosphates, and lithium nickel phosphates.

The spinel type materials can be represented by a formula of Li$_z$M$_a$N$_b$O$_4$, wherein $0.1 \leq z \leq 1.1$, and $a+b=2$, M and N are selected from alkaline-earth metal elements, Group-13 elements, Group-14 elements, transition metal elements, and rare-earth elements. In one embodiment, the M and N are selected from iron (Fe), copper (Cu), manganese (Mn), nickel (Ni), chromium (Cr), cobalt (Co), vanadium (V), titanium (Ti), aluminum (Al), Zinc (Zn), gallium (Ga), and magnesium (Mg).

For example, the spinel type material can be Li$_z$NiVO$_4$, Li$_z$M$_x$Mn$_{2-x}$O$_4$, Li$_z$Ni$_{0.5-y}$Cu$_y$Mn$_{1.5}$O$_4$, Li$_z$Fe$_{0.5-y}$Cr$_y$Mn$_{1.5}$O$_4$, and Li$_z$Al$_{0.5-y}$Cr$_y$Mn$_{1.5}$O$_4$, wherein $0<x<2$ and $0<y<0.5$. In Li$_z$M$_x$Mn$_{2-x}$O$_4$, M can be at least one of Cr, Co, Fe, Al, Ni and Cu, and (e.g., LiNi$_{0.5}$Mn$_{1.5}$O$_4$ and LiCr$_{0.5}$Mn$_{1.5}$O$_4$).

The lithium cobalt phosphates can be represented by a formula of Li$_z$Co$_{1-k}$M$_k$PO$_4$, wherein $0.1 \leq z \leq 1.1$, $0 \leq k \leq 0.9$, M can be at least one of Fe, Cu, Mn, Cr, V, Ti, Al, Zn, Ni, Ga, and Mg.

The lithium nickel phosphates can be represented by a formula of Li$_z$Ni$_{1-k}$M$_k$PO$_4$, wherein $0.1 \leq z \leq 1.1$, $0 \leq k \leq 0.9$, M can be at least one of Fe, Cu, Mn, Cr, V, Ti, Al, Zn, Co, Ga, and Mg.

In one embodiment of the lithium ion battery, the SPPY is the anode active material, the LiCoPO$_4$ is the cathode active material, and the voltage of the lithium ion battery can be about 4.25V.

Figure 4:
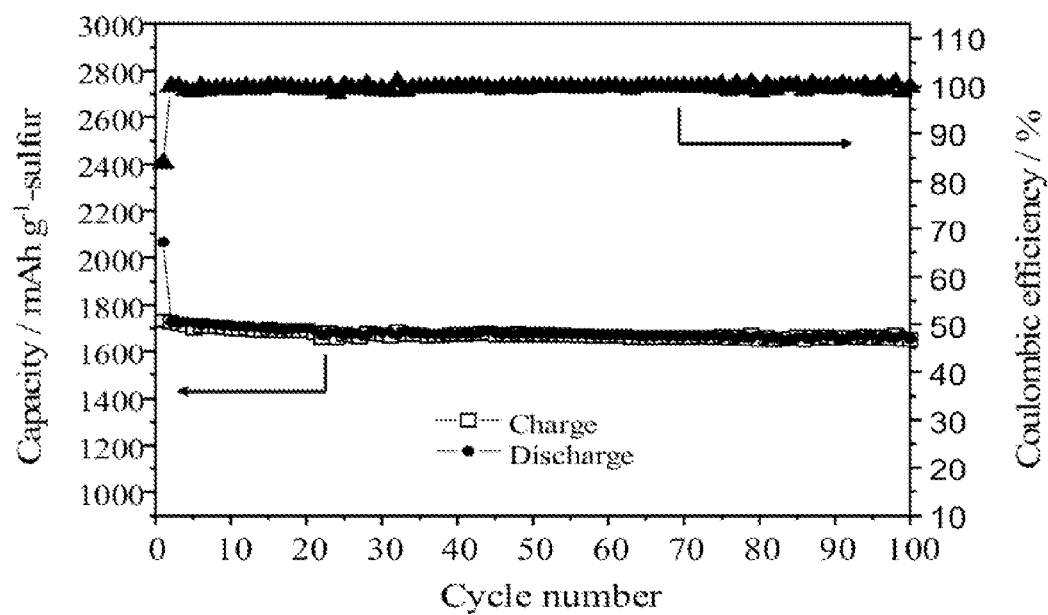
FIG. 4 shows a cycling performance and coulombic efficiencies per cycle of an embodiment of a lithium ion battery.

Referring to FIG. 4, the cycling performance of the embodiment of the lithium ion battery shown in FIG. 3 for 100 cycles is shown. A discharge capacity decrease can be observed in the second cycle, however after the decrease, the lithium ion battery still has a specific capacity of about 1750 mAh/g. All the coulombic efficiencies per cycle for the 100 cycles are above 99%. Therefore, the lithium ion battery has a relatively good capacity retention. The lithium ion battery still has a specific capacity of about 1600 mAh/g after 100 cycles. The similar tests are processed to the lithium ion batteries respectively using the LiCoPO$_4$, LiNiPO$_4$, LiNiVO$_4$, LiNi$_{0.5}$Mn$_{1.5}$O$_4$, and LiNi$_{0.4}$Cu$_{0.1}$Mn$_{1.5}$O$_4$ as the cathode active material, and the SPPY as the anode active material. The coulombic efficiencies per cycle of the 100th cycle of these lithium ion batteries are also very high (about 96% to about 99%).

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments can be associated with any other embodiments. The above-described embodiments illustrate the scope of the present disclosure but do not restrict the scope of the present disclosure.

What is claimed is:

1. A lithium ion battery comprising:
   a cathode electrode;
   an anode electrode spaced from the cathode electrode; and
   an electrolyte located between the cathode electrode and the anode electrode, wherein the anode electrode comprises an anode active material comprising sulfur grafted poly(pyridinopyridine), and the sulfur grafed poly(pyridinopyridine) comprises a poly(pyridinopyridine) matrix and sulfur dispersed in the poly(pyridinopyridine) matrix, and wherein the cathode electrode comprises a cathode active material that is at least one of spinel materials, lithium cobalt phosphates, and lithium nickel phosphates.

2. The lithium ion battery as claimed in claim 1, wherein the sulfur is a poly-sulfur group consisting of one or more sulfur elements, represented by a formula of S$_x$, and x is an integer between 1 and 8.

3. The lithium ion battery as claimed in claim 2, wherein the sulfur grafted poly(pyridinopyridine) comprises at least one chemical group of formulas:

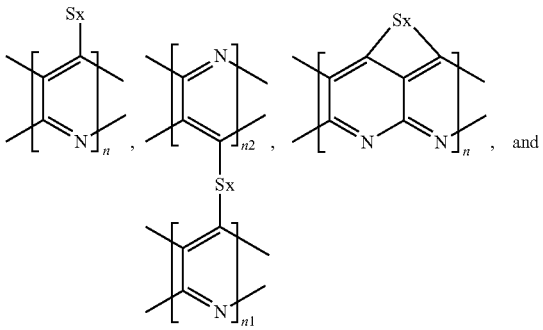

-continued

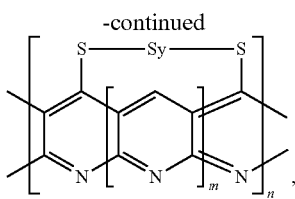

wherein n, n1, and n2 are an integer larger than 1, m and y are both an integer larger than 0.

4. The lithium ion battery as claimed in claim 1, wherein the sulfur is elemental sulfur composited with the poly(pyridinopyridine) matrix.

5. The lithium ion battery as claimed in claim 4, wherein the elemental sulfur has a shape of particles or grains, and one elemental sulfur particle is one sulfur molecule or a sulfur atom cluster consisting of a plurality of sulfur atoms.

6. The lithium ion battery as claimed in claim 1, wherein charge and discharge curves of the sulfur grafted poly(pyridinopyridine) have plateaus between a voltage range of about 0.1V to about 0.25V.

7. The lithium ion battery as claimed in claim 1, wherein the cathode electrode has a voltage larger than or equal to about 4V vs. $Li^+/Li$.

8. The lithium ion battery as claimed in claim 1, wherein the spinel materials are represented by a formula of $Li_zM_aN_bO_4$, wherein $0.1 \leq z \leq 1.1$, and $a+b=2$, M and N are selected from the group consisting of alkaline-earth metal elements, Group-13 elements, Group-14 elements, transition metal elements, and rare-earth elements.

9. The lithium ion battery as claimed in claim 8, wherein the spinel materials are $Li_zNiVO_4$, $Li_zM_xMn_{2-x}O_4$, $Li_zNi_{0.5-y}Cu_yMn_{1.5}O_4$, $Li_zFe_{0.5-y}Cr_yMn_{1.5}O_4$, and $Li_zAl_{0.5-y}Cr_yMn_{1.5}O_4$, wherein $0<x<2$ and $0<y<0.5$.

10. The lithium ion battery as claimed in claim 1, wherein the lithium cobalt phosphates are represented by a formula of $Li_zCo_{1-k}M_kPO_4$, wherein $0.1 \leq x \leq 1.1$, $0 \leq k \leq 0.9$, and M is at least one of Fe, Cu, Mn, Cr, V, Ti, Al, Zn, Ni, Ga, and Mg.

11. The lithium ion battery as claimed in claim 1, wherein the lithium nickel phosphates are represented by a formula of $Li_zNi_{1-k}M_kPO_4$, wherein $0.1 \leq x \leq 1.1$, $0 \leq k \leq 0.9$, and M is at least one of Fe, Cu, Mn, Cr, V, Ti, Al, Zn, Co, Ga, and Mg.

* * * * *